United States Patent
Wach

(10) Patent No.: US 6,460,666 B1
(45) Date of Patent: Oct. 8, 2002

(54) DIRECT MOUNT SNAP-IN AIR DAMPER

(75) Inventor: Joseph Wach, Ingleside, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/199,994

(22) Filed: Nov. 24, 1998

Related U.S. Application Data

(63) Continuation-in-part of application No. 09/177,029, filed on Oct. 22, 1998.

(51) Int. Cl.[7] .................................................. F16F 9/36
(52) U.S. Cl. .......................... 188/322.17; 188/322.22; 267/64.12
(58) Field of Search ........................ 188/322.22, 322.18, 188/288, 322.17; 267/124, 64.26, 64.12; 403/353

(56) References Cited

U.S. PATENT DOCUMENTS

| | | | | |
|---|---|---|---|---|
| 2,830,855 A | * | 4/1958 | Hyre ............................ | 304/40 |
| 3,887,961 A | | 6/1975 | Saajos ........................... | 16/56 |
| 4,323,224 A | * | 4/1982 | Freitag et al. .............. | 267/124 |
| 4,428,596 A | * | 1/1984 | Bell et al. ................... | 280/507 |
| 4,553,484 A | * | 11/1985 | Cox ............................ | 406/353 |
| 4,555,126 A | * | 11/1985 | Ishimitsu et al. ........... | 280/707 |
| 4,637,747 A | | 1/1987 | Perrin et al. .................. | 403/23 |
| 4,750,594 A | * | 6/1988 | Siemann et al. .......... | 188/322.17 |
| 4,781,608 A | | 11/1988 | Hillmann .................... | 439/212 |
| 5,104,359 A | | 4/1992 | Shirai et al. ................ | 474/110 |
| 5,398,820 A | | 3/1995 | Kiss ............................ | 211/13 |
| 5,615,867 A | | 4/1997 | Bauer ....................... | 267/64.11 |
| 5,622,242 A | | 4/1997 | Handke et al. ......... | 188/322.11 |
| 5,697,477 A | * | 12/1997 | Hiramoto et al. ....... | 188/322.18 |
| 5,716,154 A | * | 2/1998 | Miller et al. ................ | 403/353 |
| 5,741,007 A | | 4/1998 | Witt ........................ | 267/64.12 |
| 5,756,890 A | | 5/1998 | Fedison, Jr. ............... | 73/118.1 |
| 5,934,697 A | * | 8/1999 | McAndrews ................ | 267/293 |
| 6,042,091 A | * | 3/2000 | Marzocchi et al. ...... | 267/64.15 |

* cited by examiner

*Primary Examiner*—Jack Lavinder
*Assistant Examiner*—Mariano Sy
(74) *Attorney, Agent, or Firm*—Pitney, Hardin, Kipp & Szuch LLP

(57) ABSTRACT

The damper includes a damper housing and a piston assembly reciprocating therein. The damper housing includes an attachment device formed of an interior partially circular wall with a triangular cross section thereby forming an interior partially circular apex for engaging a cylindrical boss. This allows the damper to rotate about an axis of the interior partially circular wall and pivot about an axis perpendicular to the rotational axis. Additionally, the piston assembly includes a detent protrusion formed from a stem supporting a head, the radius of the head being greater than that of the stem. The detent protrusion is engaged by a keyhole-shaped aperture with a first portion with a radius of curvature substantially equal to that of the stem and a second portion with a radius of curvature substantially equal to that of the head. The detent protrusion can therefore rotate within the keyhole-shaped aperture. Additionally, the cap of the damper housing is formed of elastic O-rings to allow the piston assembly to rotate within the damper housing.

20 Claims, 2 Drawing Sheets

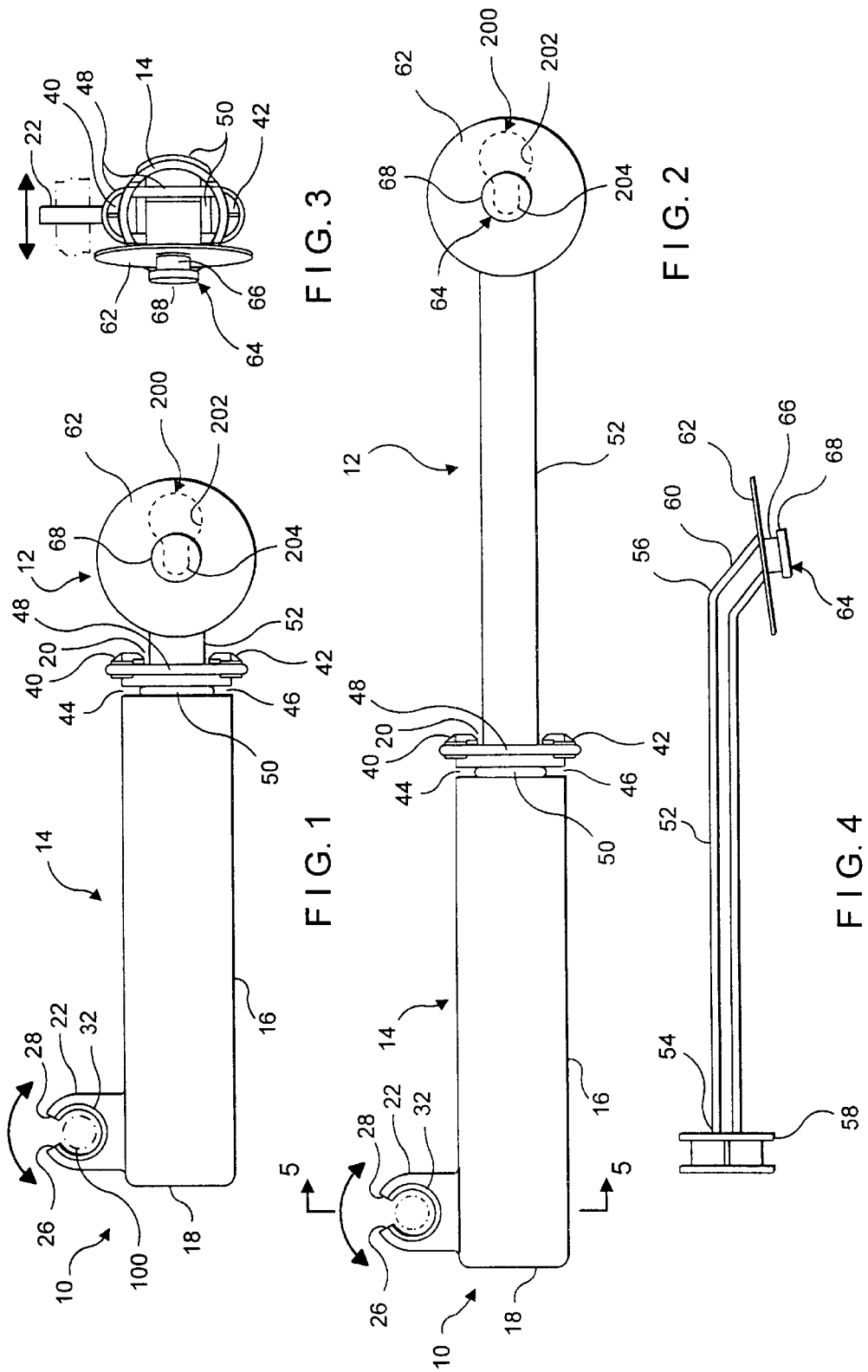

DIRECT MOUNT SNAP-IN AIR DAMPER

This application is a continuation-in-part of application Ser. No. 09/177,029 filed on Oct. 22, 1998, entitled Silent Damper with Anti-Rattle Shaft, the disclosure of which is hereby incorporated by reference.

BACKGROUND OF THE INVENTION

1. Field of the Invention

This invention pertains to a silent damper which is installed by snapping a damper housing over a boss and snapping a detent protrusion on the shaft into a keyhole-shaped aperture. In operation, the damper housing pivots both horizontally and vertically about the boss as the shaft is pulled outwardly. A typical application for such a damper would be for use with an automotive glove box wherein the boss is attached to the glove box instrument panel and the keyhole-shaped aperture is molded into the side of the glove box wall.

2. Description of the Prior Art

In the prior art, it is known to use a damper in connection with doors, particularly for gloveboxes in automotive applications. However, these prior art dampers require secondary fasteners to attach to the glovebox and to the dashboard (or other relatively stationary object) of the automobile. These secondary fasteners increase installation cost and have a tendency to rattle. These prior art dampers typically do not adjust for angled applications or dimensional variations and are therefore susceptible to binding. Additionally, these prior art dampers typically do not adjust easily between right and left-hand configurations.

Examples of prior art references in this general field of art and related fields of art include U.S. Pat. No. 5,756,890 entitled "Snap Mount Throttle Position Sensor", issued to Fedison, Jr. on May 26, 1998; U.S. Pat. No. 5,741,007 entitled "Damper Rotational Latch", issued to Witt on Apr. 21, 1998; U.S. Pat. No. 5,622,242 entitled "Shock Absorber, and Shock Absorber, Such as MacPherson Strut, with Decompression Stop Limit Bracket", issued to Handke et al. on Apr. 22, 1997; U.S. Pat. No. 5,615,867 entitled "Fluid-Filled Unit of a Cylinder and a Piston Rod, in Particular Gas Spring", issued to Bauer on Apr. 1, 1997; U.S. Pat. No. 5,398,820 entitled "Doll-Holder Wall Mount", issued to Kiss on Mar. 21, 1995; U.S. Pat. No. 5,104,359 entitled "Tensioner with Reduced Rattling", issued on Apr. 14, 1992 to Shirai et al.; U.S. Pat. No. 4,781,608 entitled "Busbar Holder of Plastic", issued on Nov. 1, 1988 to Hillmann; U.S. Pat. No. 4,637,747 entitled "Device for Mounting a Protective Cap on a Support", issued on Jan. 20, 1987 to Perrin et al.; and U.S. Pat. No. 3,887,961 entitled "Damping Assemblies for Doors or the Like", issued on Jun. 10, 1975 to Saajos.

OBJECTS AND SUMMARY OF THE INVENTION

It is therefore an object of, this invention to provide a damper, for automotive glovebox or similar applications, which can be installed without the need for secondary fasteners.

It is therefore a further object of this invention to provide a damper, for automotive glovebox or similar applications, which has a decreased tendency to rattle.

It is therefore a still further object of this invention to provide a damper, for automotive glovebox or similar applications, which has decreased installation costs.

It is therefore a still further object of this invention to provide a damper, for automotive glovebox or similar applications, which has a decreased tendency for binding.

It is therefore a still further object of this invention to provide a damper, for automotive glovebox or similar applications, which can be easily adjusted from a right-hand part to a left-hand part, and vice versa.

These and other objects are attained by providing a damper with a damper housing and a piston assembly. The damper housing includes a snap-on attachment device formed of a portion of a circle. This attachment device attaches to a cylindrical structure, such as an instrument panel boss, and allows the damper to rotate both horizontally and vertically as the shaft of the piston assembly is pulled outwardly.

The shaft of the piston assembly further includes a detent protrusion which is snapped into a keyhole-shaped aperture which is typically molded into the side of the glovebox wall.

The cap of the damper is formed from two elastic O-rings. A first O-ring generally engages the periphery of the damper housing and passes through two grooves within periphery of the damper housing so that portions of the O-ring form a first pair of parallel chords within the circular cross section of the damper housing. A second O-ring is engaged by two opposed hooks on the mouth of the damper housing so as to form a second pair of parallel chords within the circular cross section of the damper housing. The second pair of parallel chords is oriented ninety degrees with respect to the first pair of parallel chords. The rectangular intersection of the two pairs of parallel chords formed by the O-rings supports the piston shaft of rectangular cross section. The resulting elastic configuration of the O-rings compensates for misalignment of the damper and allows the piston assembly to rotate during operation of the damper without binding. Additionally, this elastic configuration allows a user or installer to simply rotate the piston by 180° within the damper housing in order to convert from a left-hand part to a right-hand part, and vice versa.

BRIEF DESCRIPTION OF THE DRAWINGS

Further objects and advantages. of the invention will become apparent from the following description and claims, and from the accompanying drawings, wherein:

FIG. 1 is a side plan view of the damper of the present invention in the retracted position, with both the instrument panel boss and the keyhole-shaped aperture of the glovebox shown in phantom.

FIG. 2 is a side plan view of the damper of the present invention in the extended position, with both the instrument panel boss and the keyhole-shaped aperture of the glovebox shown in phantom.

FIG. 3 is a front plan view of the damper of the present invention.

FIG. 4 is a side plan view of the piston assembly of the present invention.

DETAILED DESCRIPTION OF THE PREFERRED EMBODIMENT

Figure 5:
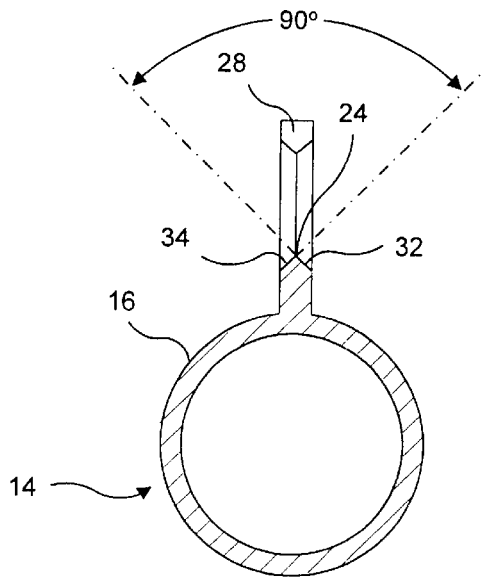
FIG. 5 is a cross-sectional view of the attachment device of the present invention along plane 5—5 of FIG. 2.

Referring now to the drawings in detail wherein like numerals refer to like elements throughout the several views, one sees that FIGS. 1 and 2 are side plan views of the damper 10 of the present invention with the piston assembly 12 in the retracted and extended positions, respectively, in relation to the damper housing 14. Additionally, the cylindrical boss 100, typically formed on an instrument panel in an automotive application, and the keyhole-shaped aperture 200, typically formed on the glovebox in an automotive application, are shown in phantom in FIGS. 1 and 2. Damper 10 is typically constructed of plastic.

Figure 6:
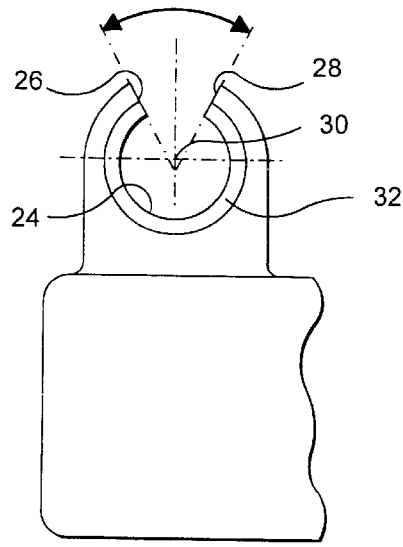
FIG. 6 is a side plan view of the attachment device of the damper housing of the present invention.

Damper housing 14 is formed by cylindrical wall 16 with closed end 18 and open end or mouth 20. Attachment device 22 is formed on cylindrical wall 16 inwardly adjacent from closed end 18 of damper housing 14. Attachment device 22 extends radially outward from cylindrical wall 16 and includes partially circular interior apex 24 which forms a portion of a circle greater than 180° and less than 360°, typically about 270°. This allows a cylindrical boss 100 to pass between the ends 26, 28 of interior circular apex 24 and be detent engaged therein while allowing damper housing 14 to rotate about cylindrical boss 100 (as shown in FIGS. 1 and 2) or, in other words, about rotational axis 30 of attachment device 22 as shown in FIG. 6. As can be seen from FIG. 6, the inclination of ends 26, 28 of interior circular apex 24 is not directly radially outward from the rotational axis 30 about which interior circular apex 24 is formed. That is, the projections of ends 26, 28 do not pass through rotational axis 30. More particularly, the opening between ends 26, 28 of interior circular apex 24 is about 90°, while the ends 26, 28 are inclined approximately 70° with respect to each other.

As shown in FIG. 5, interior circular apex 24 of attachment. device 22 is formed by the intersection of oblique circular walls 32, 34. Oblique circular walls 32, 34 are inclined at opposing 45° angles so as to form interior circular apex 24 at a 90° angle resulting in a triangular cross section as shown in FIG. 5. This configuration of interior circular apex 24 allows the portion of damper 10 toward piston assembly 12 to pivot from side to side as indicated by the arrow above FIG. 3. This pivoting is about a vertical axis ("vertical" in the illustrated configuration) perpendicular to rotational axis 30 of attachment device 22.

Figure 7:
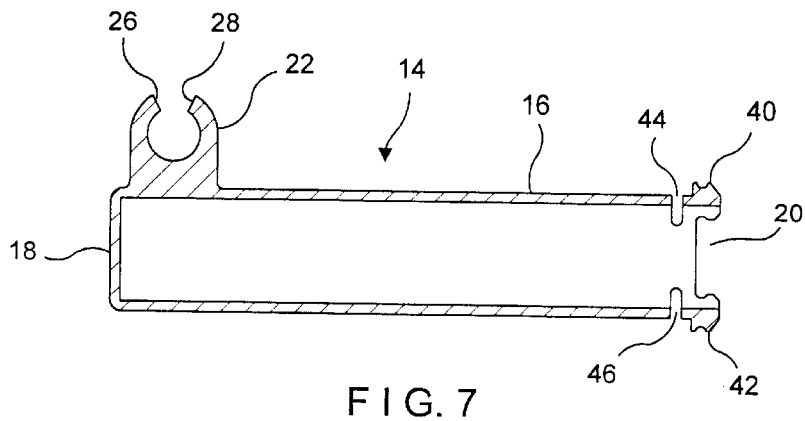
FIG. 7 is a side cross-sectional view of the housing of the damper of the present invention.
Figure 8:
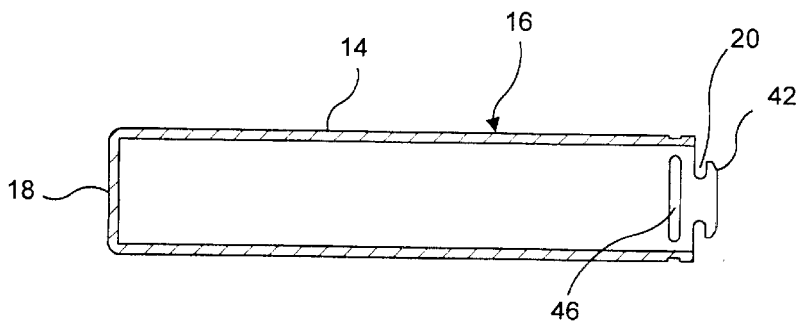
FIG. 8 is a top cross-sectional view of the housing of the damper of the present invention.

As shown in FIGS. 3, 7, and 8, mouth 20 of damper housing 14 includes opposed hooks 40, 42 which are outwardly adjacent from opposed notches 44, 46. Opposed hooks 40, 42 engage first elastic O-ring 48 and opposed notches 44, 46 engage second elastic O-ring 50. This configuration forms a cap configuration which engages piston assembly 12, but allows piston assembly to rotate without binding. This configuration further allows an installer to change simply between a right-hand configuration and a left-hand configuration and vice versa. This configuration is explained in further detail in application Ser. No. 09/177,029, filed Oct. 22, 1998, the disclosure of which is hereby incorporated by reference.

As shown in FIG. 4, piston assembly 12 includes shaft 52 with proximal end 54 and distal end 56. Proximal end 54 is attached to disk assembly 58 which slidingly engages the interior of cylindrical wall 16 of damper housing 14 during reciprocation of piston assembly 12. Disk assembly 58 may have directionally dependent damping characteristics as described in the above-identified application Ser. No. 09/177,029. Distal end 56 of shaft 52 attaches to angled portion 60, which in turn attaches to circular attachment head 62.

The center of circular attachment head 62 includes cylindrical detent protrusion 64 which further includes stem 66 which supports enlarged head 68. Both stem 66 and enlarged head 68 are of cylindrical shape, with enlarged head 68 of a greater radius than stem 66. As shown in FIGS. 1 and 2, keyhole-shaped aperture 200 includes a larger portion 202 with a radius of curvature substantially equal to the radius of enlarged head 68 and a smaller portion 204 with a radius of curvature substantially equal to the radius of stem 66. This allows enlarged head 68 to be inserted into the larger portion 202 of keyhole-shaped aperture 200 (shown in phantom) so that the stem 66 can be snapped into or otherwise engaged by the smaller portion 204 of keyhole-shaped aperture 200. This further allows stem 66 to rotate within smaller portion 204 of keyhole-shaped aperture 200 during the operation of damper 10 without binding.

Typically, keyhole-shaped aperture 200 is formed within the door of the glovebox (not shown) while boss 100 is formed on an instrument panel in an automotive application. Damper 10 therefore is used to dampen the movement of the glovebox door.

In order to use damper 10, an installer typically twists piston assembly 12, if necessary, to obtain the desired left-hand or right-hand configuration. The installer then engages attachment device 22 to boss 100 and cylindrical detent protrusion 64 to keyhole-shaped aperture 200. During operation, the position of damper 10 can self-adjust or adapt in several ways to variations or misalignment without binding. Damper 10 can rotationally pivot about axis 30 of attachment device 24. Damper 10 can additionally pivot about an axis perpendicular to axis 30 (see FIG. 3). Piston assembly 12 can rotate within damper housing 14. Cylindrical detent protrusion 64 can rotate within keyhole-shaped aperture 200. This configuration is relatively free of rattle during operation.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A damper comprising:
    a housing with cylindrical walls;
    a piston assembly reciprocating within said housing, said piston assembly including a piston shaft with a first end and a second end, said first end including a piston for reciprocally engaging an interior of said cylindrical walls, said second end including an attachment head, said attachment head including a detent protrusion;
    said housing including a mouth through which said piston assembly passes, said mouth including means for engaging elastic rings, at least one of said elastic rings including a first portion extending outwardly to at least an extent of an exterior of said cylindrical walls and a second portion extending across said mouth for slidingly engaging said piston shaft therebetween; and
    said housing including an attachment device with a partially circular interior wall for engaging a cylindrical boss, said partially circular interior wall being bounded by radially oriented ends thereby providing a gap for the boss to move radially inwardly so as to be rotationally engaged by said partially circular interior wall;
    whereby said means for engaging elastic rings and said attachment device allow the damper to adjust to a range of installation configurations thereby minimizing binding of the damper.

2. The damper of claim 1 wherein said detent protrusion includes a stem and a head, said stem separating said head from said attachment head.

3. The damper of claim 2 wherein said stem and said head are cylindrical.

4. The damper of claim 3 wherein said stem has a first radius and said head has a second radius, said second radius being greater than said first radius.

5. The damper of claim 4 wherein said detent protrusion is adapted to be engaged by a keyhole-shaped aperture including a first portion with a radius of curvature substantially equal to said first radius and a second portion with a radius of curvature substantially equal to said second radius.

6. The damper of claim 5 wherein said partially circular interior wall is formed about a rotational axis.

7. The damper of claim 6 wherein said partially circular interior wall has a triangular cross section with a partially circular interior apex formed by an intersection of oblique circular walls, said apex engaging the cylindrical boss.

8. The damper of claim 7 wherein said partially circular interior wall allows the damper to rotate about said rotational axis, and wherein said partially circular interior apex allows the damper to pivot about an axis perpendicular to said rotational axis.

9. The damper of claim 8 wherein said gap is bounded by walls formed on planes which are free from intersection with said rotational axis.

10. The damper of claim 9 wherein said attachment device snap detent engages the cylindrical boss.

11. The damper of claim 10 wherein said damper housing includes a mouth through which said piston assembly passes, said mouth including means for engaging elastic rings for slidingly engaging said piston shaft.

12. The damper of claim 1 wherein said means for engaging elastic rings engages a first elastic ring and a second elastic ring whereby said first elastic ring and said second elastic ring extend across chords of said mouth.

13. The damper of claim 12 wherein said means for engaging elastic rings engages said first elastic ring and said second elastic ring whereby said first elastic ring extends across a first pair of parallel chords of said mouth and said second elastic ring extends across a second pair of parallel chords of said mouth.

14. The damper of claim 13 wherein said first pair of parallel chords is perpendicular to said second pair of parallel chords.

15. The damper of claim 14 wherein said means for engaging elastic rings includes a pair of notches passing through said cylindrical walls for engaging said first elastic ring and a pair of hooks formed longitudinally adjacent to said pair of notches for engaging said second elastic ring.

16. A damper comprising:
a housing with cylindrical walls;
a piston assembly reciprocating within said housing, said piston assembly including a piston shaft with a first end and a second end, said first end including a piston for reciprocally engaging an interior of said cylindrical walls, said second end including an attachment head, said attachment head including a detent protrusion;
said housing including a mouth through which said piston assembly passes, said mouth including means for slidingly engaging said piston shaft between chords formed from an elongated elastic ring; and
said housing including an attachment device with a partially circular interior wall for engaging a cylindrical boss, said partially circular interior wall being chamfered thereby forming an interior partially circular apex, said interior wall further being bounded by radially oriented ends thereby providing a gap for the boss to move radially inwardly through said gap so as to be captured and rotationally engaged by said interior partially circular apex of said partially circular interior wall;
whereby said means for slidingly engaging said piston shaft and said attachment device allow the damper to adjust to a range of installation configurations thereby minimizing binding of the damper.

17. The damper of claim 16 wherein said partially circular interior walls allows the damper to rotate about a rotational axis, and wherein said interior partially circular apex allows the damper to pivot about an axis perpendicular to said rotational axis.

18. An assembly including:
a structure including a cylindrical boss;
a door which pivots with respect to said structure between an open position and a closed position, said door including a keyhole-shaped aperture with a first portion with a relatively smaller diameter offset from a second portion with a relatively larger diameter;
a damper which damps pivoting of said door between said open position and said closed position, said damper including;
a housing with cylindrical walls;
a piston assembly reciprocating within said housing, said piston assembly including a piston shaft with a first end and a second end, said first end including a piston for reciprocally engaging an interior of said cylindrical walls, said second end including an attachment head, said attachment head including a detent protrusion for engaging said keyhole shaped aperture;
said housing including a mouth through which said piston assembly passes, said mouth including a cap structure for slidingly engaging said piston shaft between chords formed from an elongated elastic ring, said cap structure further allowing said piston assembly to rotate within said cylindrical walls; and
said housing including an attachment device with a partially circular interior wall for engaging said cylindrical boss, said interior wall being bounded by radially oriented ends thereby providing a gap for said cylindrical boas to move radially inwardly through said gap so as to be captured and rotationally engaged by said partially circular interior wall;
whereby said cap structure and said attachment device allow the damper to adjust to a range of installation configurations thereby minimizing binding of the damper.

19. The assembly of claim 18 wherein said partially circular interior wall is chamfered thereby forming an interior partially circular apex.

20. The assembly of claim 18 wherein said structure is an automotive dashboard structure, said door is an automotive glove box and said assembly is an automotive glove box assembly.

* * * * *